United States Patent Office.

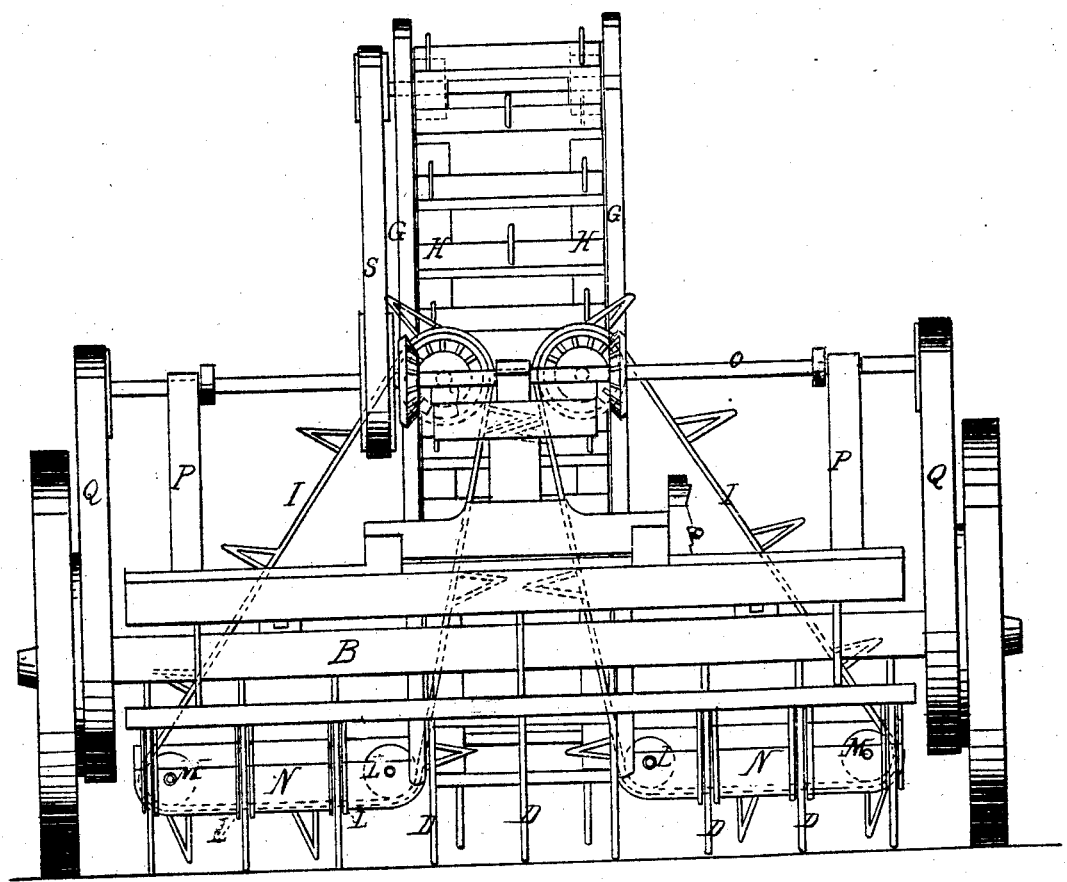

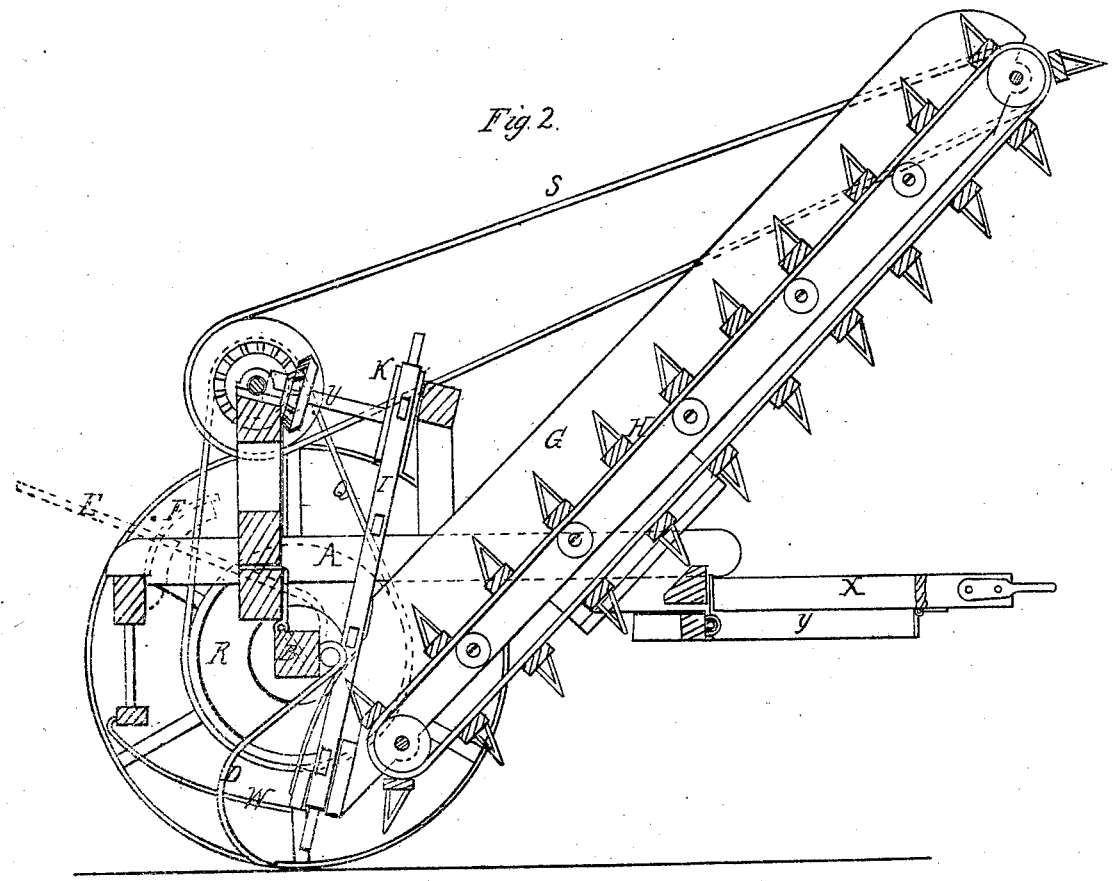

ANDREW SHELINE, OF EDON, OHIO.

Letters Patent No. 94,782, dated September 14, 1869.

HAY-RAKER AND LOADER.

The Schedule referred to in these Letters Patent and making part of the same.

*To all whom it may concern:*

Be it known that I, ANDREW SHELINE, of Edon, in the county of Williams, and State of Ohio, have invented a new and improved Hay-Rake and Loader; and I do hereby declare that the following is a full, clear, and exact description thereof, which will enable others skilled in the art to make and use the same, reference being had to the accompanying drawing, forming part of this specification.

The object of this invention is to provide a simple and efficient hay-raking and loading-apparatus, for attachment to a wagon, so that while being drawn along behind the wagon it will gather up the spread hay and deliver it to the said wagon.

The invention comprises certain arrangements of the parts, as will be hereinafter more fully specified.

Figure 1 represents a rear elevation of my improved machine, and

Figure 2 represents a longitudinal sectional elevation of the same.

Similar letters of reference indicate corresponding parts.

A represents a frame for supporting the operating parts, connected to the axle B by hinge-joints C.

The said axle B serves as the rake-head, the spring wire teeth D being connected to it, and is provided with a bent lever, E, for oscillating it to change the position of the teeth, when required.

The said lever engages with a curved notched bar, F, secured to the frame, for holding it where required.

From the frame A, and inclining forward, rise two elevator-supports, G, for supporting the endless elevator H, designed to take the hay from the front of the rake and deliver it on to the wagon.

In order to make this elevator and its supports as light as possible, I propose to make it considerably narrower than the rake, and this requires the employment of a means for moving the hay gathered each side of the said elevator toward the centre, to be taken up by it.

For this purpose I provide the laterally-moving elevators I, working over the pulleys K L M, and along the under side of the troughs N, running toward the centre from each end of the rake, and in advance of the said rake.

For operating these elevators, as also the elevator H, I provide a transverse shaft, O, in suitable bearings, P, rising up from the frame and operated by belts Q, from pulleys on the inner sides of the supporting-wheels R, from which shaft motion is imparted to the elevator H by a belt, S, and to the elevators I by the shafts V, driven by suitable gear-wheels and carrying the pulleys K.

To prevent the hay from gathering behind the troughs N, in the spaces between them and the upper parts of the rake-teeth, the guard-wires W, between which the rake-teeth project, are provided.

The frame is provided with a tongue, X, for connecting it to the wagon to be loaded, and from the tongue is suspended a hinged stand, Y, for supporting it when not attached to the wagon.

Having thus described my invention,

What I claim as new, and desire to secure by Letters Patent, is—

1. The rake B D, elevator H, and carriers I, arranged as herein shown and described, for the purpose specified.

2. The arrangement of the rake-head B, forming the axle of the truck, the frame A, and the operating-lever, E, substantially as specified.

3. The arrangement of the guards M, rake-fingers D, and troughs N, substantially as specified.

ANDREW SHELINE.

Witnesses:
ELI SHELINE,
DAVID FLEGAL.